Sept. 24, 1968     W. D. LESTER     3,402,538
ANTIWRAP DEVICE
Filed Oct. 20, 1965
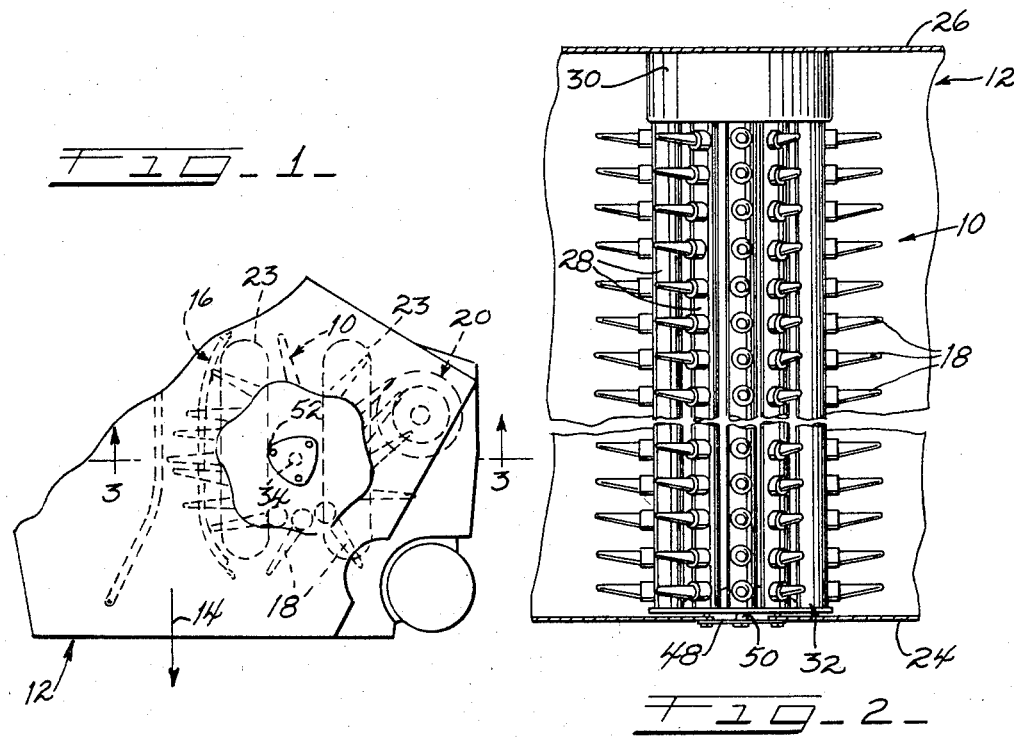
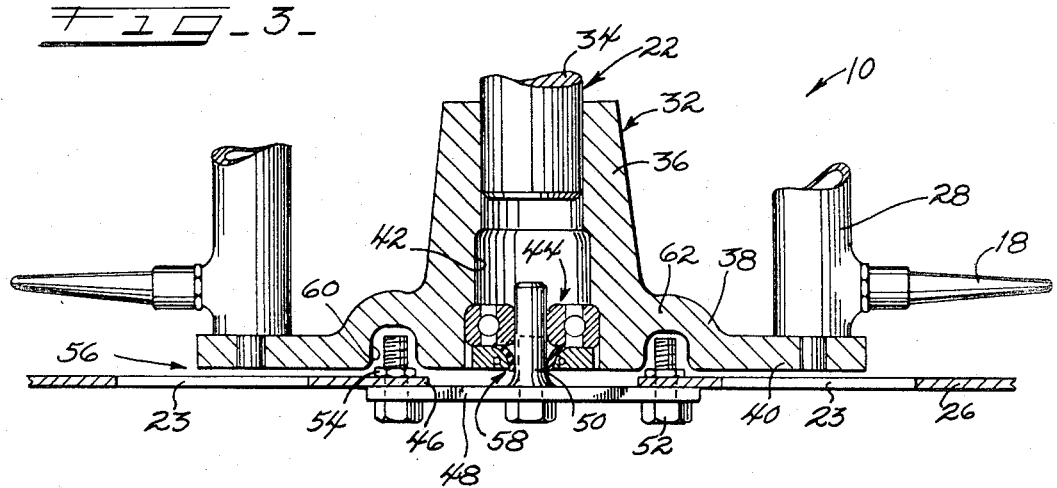
INVENTOR
WILLIAM D. LESTER
BY John J. Kowalik
ATT'Y United States Patent Office 3,402,538
Patented Sept. 24, 1968

3,402,538
ANTIWRAP DEVICE
William D. Lester, Memphis, Tenn., assignor to International Harvester Company, a corporation of Delaware
Filed Oct. 20, 1965, Ser. No. 498,796
6 Claims. (Cl. 56—44)

The present invention relates to agricultural apparatus and particularly to an antiwrap device for rotating parts exposed to vegetation while the apparatus is operating in the field.

The device of the invention is useful in conjunction with a rotating member mounted in a fixed support, where various materials, particularly those in the form of shreds, filaments, etc., come in contact therewith and are likely to become wrapped and wound on the rotating member in the space between the rotating member and the fixed support.

The device is particularly useful in such machines as cotton pickers.

A well known form of cotton picker includes a plurality of spindles which penetrate into the cotton plants as the picker moves therealong. These spindles are mounted on a plurality of vertical picker bars, these picker bars being incorporated in a drum which includes a central mounting and support shaft. The central shaft is journalled in fixed members or plates, and the picker bars orbit attendant to rotation of the central shaft. The character of that kind of cotton picker is such that the journals or bearings of the central shaft are actually in the midst of, or at least are closely adjacent, the cotton plants, and at least the lower journal of the central shaft is close to the ground, and as a consequence, vines, long grasses, etc., become wrapped and entangled in the space between the end of the central shaft and the corresponding fixed plate, jamming the structure so that it becomes inoperative.

A broad object of the invention is to provide novel means for preventing the disadvantages outlined above.

A more specific object is to provide, in conjunction with a rotating shaft journalled in a fixed mounting member, means for shielding the journal and bearing structure in the space between the end of the shaft and the fixed mounting member.

A still more specific object is to provide, in conjunction with a shaft journalled in a fixed mounting member, structure which includes a plurality of projections preferably in the form of threaded screws, arranged in a pattern distributed around the journal and bearing means and extending across the space between the shaft and fixed member and into an annular recess in the opposite member, thereby providing means against which or around which vines, grasses, etc., wrap and entwine, and prevent their becoming entangled with the bearing means which also extends across that space and operatively interconnects the shaft and fixed member. Excessive windings of the weeds are caused to break off by abrasion against the sharp edge threads on the projections.

Other objects and advantages of the invention will appear from the following detail description taken in conjunction with the accompanying drawing wherein:

FIGURE 1 is a plan view of a fragment of a cotton picker showing a picker drum in which the device of the present invention is incorporated;

FIGURE 2 is a side view of the drum shown in FIGURE 1; and

FIGURE 3 is an axial sectional view of the lower end of the picker drum, oriented according to line 3—3 of FIGURE 1.

Referring now in detail to the drawing the picker drum referred to is shown in its entirety at 10, the cotton picker in which it is incorporated being shown only fragmentarily at 12, this kind of picker being well known. The cotton picker moves along rows of cotton plants in the direction indicated by the arrow 14 and the cotton plants move rearwardly, relatively speaking, through a passage 16. The drum 10 includes a plurality of spindles 18 and the drum is rotated for carrying the spindles in an orbiting path and through the passasge 16. The spindles 18 project directly into the plants and engage the cotton bolls and wind them thereon. The spindles then come into engagement with doffer means 20 which removes the cotton from the spindles in a known manner, the cotton then being transferred to a storage basket.

FIGURE 2 shows the drum 10 in side view, while FIGURE 3 is an axial sectional view of the lower portion of the drum and the bottom plate 24 in which the drum is journalled. The lower end of the drum, which is that portion shown in FIGURE 3, is closely adjacent the ground, in order that all of the cotton will be picked, to the lowermost positions on the plants. The bottom plate is provided with openings 23 for passage of air and for carrying off small trash. Many vines and long grasses abound in the fields and they project through the openings 23 and reach the lower end of the drum, and become entangled and entwined therewith, as referred to again hereinbelow.

The drum includes a vertical central shaft 22 journalled at top and bottom in at a top plate 26 and the bottom plate 26, respectively, and a plurality of vertical picker bars 28 individually journalled in the drum. Upon rotation of the drum about the axis of the central shaft 22, the picker bars 28 are carried in orbit around the shaft, as referred to above. Each picker bar is provided with a plurality of the spindles 18, also referred to above.

The central shaft includes a head member 30 and a pedestal 32 in which the picker bars 28 are mounted. The pedestal 32 and other portions of the lower end of the drum are given detail attention hereinafter.

The central shaft 22 includes a shaft element 34 and the pedestal 32 forms a hub means of the shaft. The pedestal 32 includes an upstanding tubular portion 36 receiving the lower end of the shaft element 34 in a suitable manner such as by a press fit, and a lower portion 38 which includes a bottom plate element 40 in which the lower ends of the picker bars 28 are pivoted. The bore of the pedestal provides a downwardly opening axial socket 42 receiving bearing means 44 for journalling the lower end of the shaft.

The bottom plate 26 is provided with an aperture 46 for use in journalling the shaft 22. A mounting plate 48 is secured to the bottom plate 26 in closing relation to the aperture, and is provided with an upstanding stud 50 forming a pivot means cooperating with the bearing means 44 for supporting the drum. The plate 48 is detachably secured in place by a plurality of bolts 52, which may be as few as two, but preferably three or more (see also FIGURE 1), inserted through apertures in the mounting plate 48 and secured in place as by threading in the bottom plate 26 or by nuts 54 threaded on the bolts 52 above the bottom plate.

In the mounting of rotatable members such as the drum 10 in a fixed member, a space exists therebetwen, such as 56 in the present instance. This space is necessarily greater than precision space, and vines, grasses, etc., can easily enter into the space and when they do they become wrapped or entwined or entangled about the pivot stud 50 and when that occurs, they form a mat or mass which increases in size and is forced up into the socket 42 against the bearing means 44 and such other elements as, for example, an oil seal 58 generally provided in such cases. This is a serious disadvantage that has heretofore been encountered in installations of this kind but the device of the present invention effectively overcomes this disadvantage.

The pedestal 32 is provided with an annular recess 60 in its under surface in register with the bolts 52 which may also be referred to as spikes. The pedestal is provided with the desired and necessary conformations such as an annular shoulder 62 to provide the necessary body for the recess 60 to be formed therein. The bolts or spikes 52 are of such predetermined length as to extend into the recess 60, and thus extend entirely across the space 56. Other protections may be utilized for extending into the recess 60, but for convenience the same bolts 52 that are used for detachably supporting the mounting plate 48 may be used as the bolts or spikes that extend into the recess 60.

When vines, grasses, etc., enter into the space 56 in the manner referred to above, and in response to rotation to the central shaft 22 and specifically rotation of the pedestal 32, those vines and grasses are drawn into the space, and in the absence of the device of the present invention would wrap and entwine around the pivot stud 50 to the detriment referred to above. However, in the present instance those vines and grasses are obstructed by teh bolts or spikes 52 and prevented by them from becoming wrapped around the pivot stud 50. Whether two bolts 52, or more than two, are utilized, the vines and grasses wrap around them and are held outwardly from the pivot stud. The extension of the bolts into the annular recess 60 prevents the vines and grasses from passing over the ends of the bolts. Thus all damage to the bearing means 44 and oil seal 58 is eliminated and the down time and consequent maintenance costs from this source are eliminated, or greatly minimized.

While a cotton picker may constitute particularly advantageous adaption of the invention, it will be understood that the invention may be applied to other kinds of apparatus. For example, various other kinds of agriculture implements encounter vines and grasses that can become entangled therein and in those cases the use of the present invention will be advantageous. In addition, the invention may be applied to various kinds of other apparatus, and in fact any kind of apparatus where materials in the form of shreds, filaments, etc., may be encountered and constitute difficulty of the character disclosed.

While I have herein disclosed a preferred form of the invention it will be understood that changes may be made therein within the scope of the appended claims.

I claim:

1. Antiwrap structure for use in conjunction with a pair of members, namely, a shaft journalled on a fixed member, and axial pivot means on one of the members extending into the other, there being a space between the members surrounding the pivot means, said antiwrap structure comprising a plurality of projections on one of the members distributed around the pivot means in radially spaced relation thereto and extending across such space in direction axially of the shaft and into an annular recess in the other member.

2. The invention set out in claim 1 wherein the projections are secured in the fixed member and are thus stationary relative to the rotatable member, and the annular recess is in the shaft.

3. The invention according to claim 1 wherein said projections comprise a screw element presenting sharp vine-cutting threads.

4. Antiwrap structure for use in conjunction with a shaft rotatably mounted in a fixed member, the fixed member having a pivot element extending into the rotatable shaft, the rotatable shaft having a hub member adjacent the fixed member of radially enlarged dimensions and there being a space between the end of the hub member and the fixed member surrounding the pivot element, comprising, in combination, a plurality of spikes in the fixed element distributed around the pivot element in radially spaced relation thereto and extending across said space in direction axially of the shaft, said hub element having an annular enlargement positioned outwardly of said pivot element and having an annular recess in its surface facing the fixed member in register with said spikes, said annular recess being formed in said annular enlargement, and said spikes extending into said annular recess.

5. Antiwrap structure comprising a shaft journalled on a fixed member, said shaft having a radially enlarged hub member at its end adjacent said fixed member, said hub member having an axial socket facing said fixed member, bearing means and oil seal means in said socket, a pivot stud on said fixed member extending into such socket and cooperating with said bearing means for journalling the shaft, said hub member having a radially enlarged plate-like portion overlying and facing said fixed member and there being a space between the end of the hub element and the fixed member surrounding said pivot element and extending radially throughout the extent of said plate-like portion, said hub member having an annular enlargement in axial direction and having an annular recess in said enlargement and opening through the surface of the hub member facing said fixed member, and a plurality of spikes in said fixed member extending across said space in direction axially of the shaft and into said annular recess, said hub member extending radially beyond said annular recess.

6. Antiwrap structure comprising a shaft having a hub member at one end of substantial radial extent, a fixed member with an aperture therein, a mounting plate detachably secured over said aperture and having a pivot stud extending into said socket, bearing means in said socket cooperating with said pivot stud for journalling said shaft on the fixed member, and oil seal in said socket, there being a space between said hub member and fixed member of substantial radial extent around said pivot stud, a plurality of bolts arranged in a circle concentric with said pivot stud securing the mouting plate to said fixed member, said hub member having a radial enlargement spaced outwardly from said socket and an annular recess in said enlargement opening through the surface of the hub member facing said fixed member, said annular recess being in register with the circle containing said bolts, said bolts having extensions forming spikes extending across said space in direction axially of the shaft and into said annular recess, said mounting plate being removable for enabling removal of the shaft means.

References Cited
UNITED STATES PATENTS 2,302,180   11/1942   Brown et al. _____ 56—44
2,830,427   4/1958   Odom _____ 56—44

ROBERT E. BAGWILL, *Primary Examiner.*